June 1, 1943.  L. EDELMANN  2,320,417
HYDROMETER
Filed June 18, 1940

Inventor
Leo Edelmann
By Lloyd W. Patch
his Attorney

Patented June 1, 1943

2,320,417

UNITED STATES PATENT OFFICE 2,320,417

HYDROMETER

Leo Edelmann, Chicago, Ill.

Application June 18, 1940, Serial No. 341,186

2 Claims. (Cl. 265—45)

My invention relates to improvements in hydrometers, and more particularly to a suction hydrometer of the type ordinarily employed for testing battery acid, radiator solutions and other liquids and solutions.

The primary object of my invention is to provide a hydrometer of this character, or means for use with a suction hydrometer, whereby a constant or fixed level of a test quantity of liquid will be taken into the hydrometer by suction and when the predetermined or desired fixed or constant level of liquid has been attained no further liquid will be taken into the instrument.

Another object is to so construct the parts that my invention can be adapted or applied to and used with substantially all types of hydrometers of the suction type.

Still another purpose is to provide a hydrometer in which the liquid will be drawn into a liquid receiving and float element containing barrel to a predetermined and fixed desired level intermediate the ends of the barrel and then when this desired height of liquid has been attained the suction drawing liquid into the barrel will be discontinued and further liquid will not be taken into the hydrometer.

Still another purpose is to provide an instrument of the above character in which the liquid is taken into the hydrometer by suction, and when the desired height or level or quantity of liquid has been taken into the hydrometer the suction will be closed, thereby preventing the taking in of excess liquid and at the same time preserving the suction creating means in such condition that any tendency to leakage of the liquid from the hydrometer will be counteracted and obviated.

Yet another object of my invention is to provide, for use with a suction type of hydrometer, a tube through which suction is created for taking a test quantity of liquid into the hydrometer, and means for closing the tube against suction when the desired quantity of liquid has been taken into the hydrometer.

A further object and purpose of my invention is to provide a plug portion insertable in a hydrometer in the path of suction and provided with a depending tube through which suction is created, together with a float actuated valve at the depending end of the tube subject to actuation when the test quantity of liquid in the hydrometer attains a desired level for cutting off the suction and thereby stopping the intake of liquid.

With the above and other objects in view, some of which are inherent in the construction and association of the parts and others of which will be apparent to those skilled in the art, my invention includes certain novel features of construction and combinations of parts which will be hereinafter set forth in connection with the drawing, and then pointed out in the claims.

Figure 1:
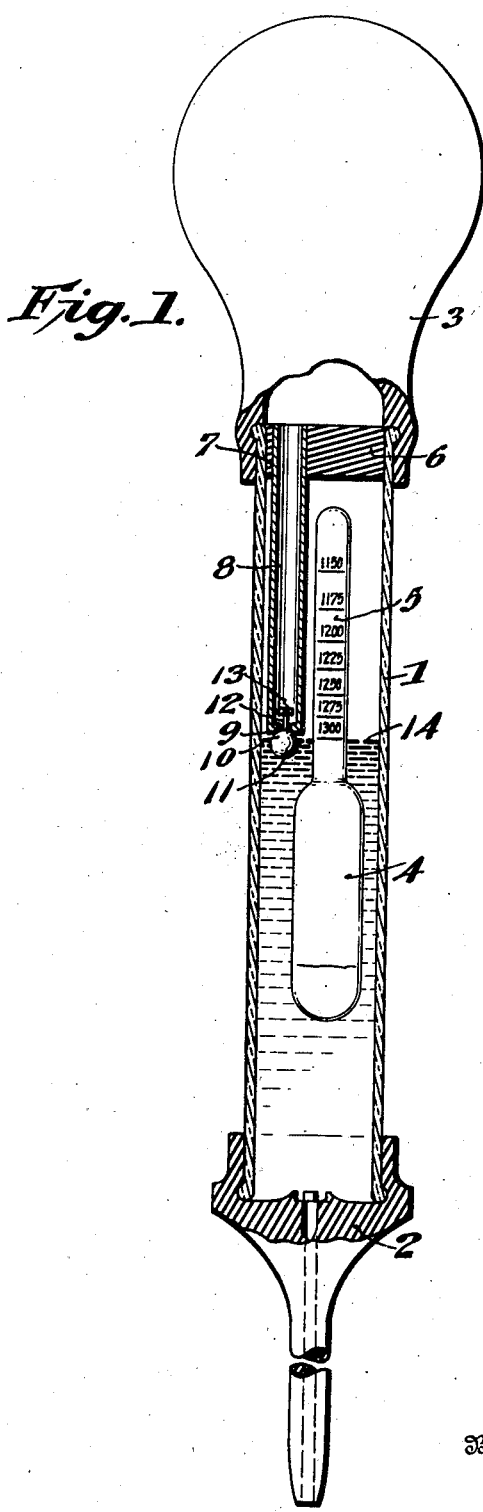
Figure 1 is a view in side elevation, and with parts in vertical section, illustrating a hydrometer embodying my invention.

In the embodiment disclosed in Figure 1, I have shown my invention in conjunction with the ordinary syringe or suction type of hydrometer, and the transparent liquid and float barrel 1 has a nozzle 2, or other intake member attached at one end, while a suction bulb 3 is attached at the opposite end of the liquid and float barrel. The liquid and float barrel 1 can be of any desired suitable shape and length and size, and can be made of any suitable material, and the intake member 2 applied at the intake end of the barrel 1 as well as the suction member 3 applied at the suction end of the barrel can be of any standard or known or desired shape and construction and can be attached to or associated with the barrel 1 in any desired and suitable manner. A hydrometer float element 4 is received within the liquid and float barrel 1 to be movable therein intermediate the ends, and in the present instance the float element is shown as being of the type having a scale or indicating stem 5. With this float element and hydrometer structure the desired test quantity of liquid can be drawn through the intake member 2 by means of suction member 3, and liquid is taken into the barrel 1 to rise to a sufficient height therein so that the float element 4 will function to show on the gauge stem 5 thereof, and at the surface of the liquid level, the desired specific gravity reading or indication, or other matter or indication based upon specific gravity of the test quantity of liquid.

With a hydrometer of the type or character described, used in the manner set forth, it is essential that the liquid level to which the test quantity of liquid is drawn into the barrel 1 be at such height that the stem 5 can rise to the desired and necessary distance above the level of the liquid as the specific gravity increases, and that the hydrometer float element 4 can sink to submerge the stem 5 for the desired and necessary distance as the specific gravity of the liquid decreases. Therefore, the liquid and float barrel 1 is ordinarily made sufficiently long to accommodate maximum flotation and maximum submergence of the hydrometer float element, and as it is customary to manually gauge the quantity of test liquid drawn into this barrel 1, it becomes necessary that the barrel be made somewhat longer than the maximum requirements, to thus avoid contact of either the top or the bottom of the hydrometer float element in case of an excessive or deficient quantity of liquid being taken into the liquid barrel.

It is desirable that the liquid and float barrel 1 be made of a minimum length sufficient to meet the requirements, and yet that the liquid level or height of the test quantity of liquid in this barrel be at such a point that the hydrometer float element can freely rise to the height or sink to the depth necessary to give proper and accurate indications of specific gravity without being stopped or coming in contact with portions of the hydrometer structure at the suction or intake ends of the barrel.

Figure 2:
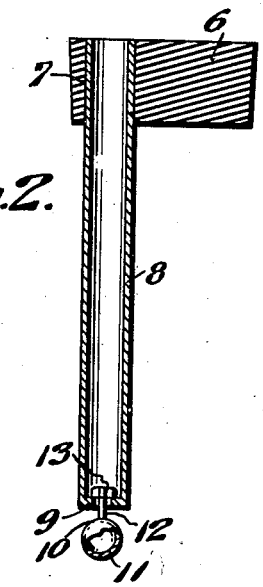
Fig. 2 is an enlarged longitudinal sectional view through a structure insertable in ordinary hydrometer structure for carrying out my invention.

With the above purpose in mind, I provide a stopper or closure portion 6 to be fitted or connected at the suction end of the barrel 1 and having an opening 7 therethrough. A suction tube 8 is fitted in liquid-tight connection through or at the opening 7 and depends into the liquid barrel 1 to have its depending end intermediate the intake and the suction ends of the barrel 1 and in proximity to the point of desired liquid level or height, within the barrel 1. The tubular portion 8 has an opening 9 at its lower end, and a valve 10 is located in position to close this opening 9. In the present instance I have shown this valve 10 as comprising a combination valve and float ball 11 having a stem portion 12 extending movably through the opening 9 to locate and retain the valve portion 11. A head or extending portion 13 is provided for retaining this stem 12 in the opening 9, and when the liquid barrel 1 is emptied or liquid therein is below the point of flotation of the combined float and valve 11 the valve will drop to the open position substantially as shown in Fig. 2, and the tubular portion 8 is then freely opened for movement of air therethrough under suction or pressure forces created by the bulb or suction member 3.

The tubular portion 8 will preferably be mounted or located at one side within the liquid and float barrel 1 so that the movement of the hydrometer float element 4 will not be impeded or interfered with, and when the parts are assembled as shown in Figure 1, the intake portion 2 will be inserted in the liquid and the suction portion 3 is actuated to draw liquid through the intake portion 2 and consequently into the liquid and float barrel 1. As the liquid rises in this barrel 1 to the desired height of the fixed level, the float portion 11 will be buoyed up to seat the valve portion thereof within the opening 9 and consequently the suction force through the tubular portion 8 will be cut off and the intake of liquid through the intake portion 2 will be stopped with the height or level of the liquid within the barrel 1 at the desired fixed level, as indicated at 14.

Since the bulb 3, or other suction creating means, will ordinarily be of capacity greater than required to take in the test quantity of liquid to the desired level, the valve 10 when moved to the closed position by flotation will be retained in this closed position through drawing force exerted by the suction portion 3, and consequently if the liquid level at 14 should be disturbed through tilting of the instrument or through any other cause the reserve suction will maintain the valve portion 10 in the closed position to thus maintain the capillary attraction holding the liquid in the liquid barrel 1 and preventing dripping from the intake portion, or if the valve 10 should by any cause be opened the reserve suction force will exert pull against the liquid to prevent dripping or leakage.

Figure 3:
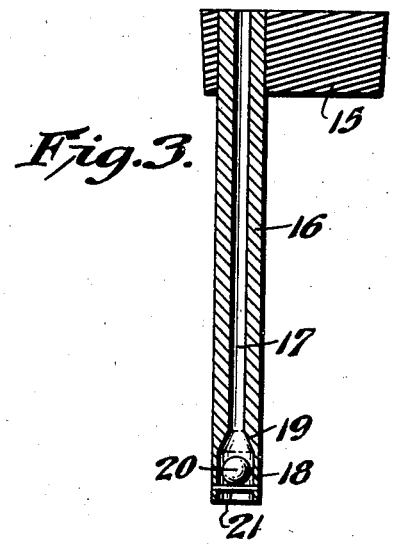
Fig. 3 is a view similar to Fig. 2 illustrating a modified construction.

With the adaptation illustrated in Fig. 3, the closure member 15 has a tubular portion 16 depending therefrom and provided with a longitudinal passage or opening 17. At its lower end this passage 17 is widened out, as at 18 and is provided with a valve seat formation 19. A combined float and valve member 20 is fitted in the enlarged opening at 18 to be retained in place by a pin 21, or other suitable retaining means, so that as this structure is used in connection with a liquid barrel and the liquid rises in the barrel the member 20 will be buoyed up or floated to close within or against the valve seat at 19 to consequently cut off or stop suction through the passage 17.

The portions 11 and 20 can be made of any desired material, and can be constructed in any suitable and desired manner, being hollow to give the desired buoyancy, or being constructed of some material inherently sufficiently buoyant in the particular liquid or solution to be tested.

Obviously, the valve portion 10 and the portion around or adjacent to the opening 9 can be made of any desired shape and conformation that will serve as valve or closure means for the tubular suction passage or portion 8, and since the various forms and types of valve structure are multitudinous and are for the most part well known, no attempt is here made to describe or illustrate various valve structures adaptable for use in this connection. The essential requisite is that valve structure be provided that will effectively close the suction tube 8, said valve structure being float actuated to thus cut off or close the suction when the desired and predetermined level of liquid has been attained.

The suction controlling means or parts, as illustrated in Figs. 2 and 3, can be used in various types and forms of suction hydrometers, the plug or closure portion being fitted at the suction end of a hydrometer barrel with the tube depending or extending into the barrel to a point intermediate the ends, and the float actuated valve being presented at this extending end to close the suction when a desired test quantity of liquid has been taken into the hydrometer structure or barrel.

With this construction, the suction tube depends or extends into the liquid barrel or liquid receiving chamber portion of the hydrometer so that the inlet end is substantially at the point of desired liquid level within the hydrometer chamber, and as the liquid is drawn into this chamber to the desired constant or fixed or predetermined level, the float valve means will close the inlet end of the suction tube to thus cut off the suction and in this manner the liquid level at 14 will be substantially fixed or constant so that upon each occasion of use of the hydrometer the hydrometer float element can be read at this fixed or constant level. Consequently, it will be possible to provide a fixed scale etched or otherwise shown upon the liquid barrel 1, or displayed in any other desired manner in position to be viewed with the float element.

While I have herein shown and described only certain specific embodiments of my invention and have set forth only certain other possible or suggested embodiments or adaptations, it will be appreciated that many changes and variations can be made in the form, construction and assembly, and in the manner of association and use of the parts with a hydrometer structure, without departing from the spirit and scope of my invention.

I claim:

1. A suction hydrometer comprising a liquid receiving barrel, liquid inlet means at one end of the barrel, suction inducing means at the opposite end of the barrel, a closure mounted at the suction end of the barrel, a suction tube carried by the closure and extending into the liquid receiving barrel, said suction tube having an inlet end intermediate the ends of the liquid receiving barrel substantially at a point corresponding with a desired liquid level therein and having its remaining end communicating with the suction inducing means, and valve means at the inlet end of the suction tube closed by liquid force when the desired liquid level is attained within the liquid barrel whereby the suction inducing means is rendered ineffectual.

2. A suction hydrometer comprising a liquid receiving barrel, liquid inlet means at one end of the barrel, suction inducing means at the opposite end of the barrel, a float element in the liquid receiving barrel, closure means for the end of the liquid receiving barrel adjacent to the suction inducing means having a suction opening therethrough and provided with a suction tube portion depending into the liquid barrel and terminating in a suction inlet end intermediate the ends of the liquid barrel and substantially at a point corresponding to a desired level for a test quantity of liquid in said liquid barrel for the float element, and float actuated means at the inlet end of the suction tube adapted to close said tube to suction inlet when the desired level of liquid has been attained in the liquid barrel.

LEO EDELMANN.